United States Patent [19]  [11] Patent Number: 5,676,995
Cully et al.  [45] Date of Patent: Oct. 14, 1997

[54] METHOD FOR REDUCING THE VISCOSITY OF CHOCOLATE

[75] Inventors: Kevin John Cully, Lake Bluff; Federico De Loyola Carvallo, Wheeling; Qadri Mustafa Abdallah, Lake Villa, all of Ill.; Gunther Rudolf Gaim-Marsoner, Hauterive, Switzerland

[73] Assignee: Kraft Foods, Inc., Northfield, Ill.

[21] Appl. No.: 790,217

[22] Filed: Feb. 3, 1997

Related U.S. Application Data

[63] Continuation of Ser. No. 461,430, Jun. 5, 1995, abandoned.
[51] Int. Cl.⁶ .................................................. A23G 1/00
[52] U.S. Cl. ................................................. 426/660; 426/659
[58] Field of Search ................................. 476/660, 659

[56] References Cited

U.S. PATENT DOCUMENTS

| | | | |
|---|---|---|---|
| 3,395,020 | 7/1968 | Chozianin et al. | 99/23 |
| 3,544,328 | 12/1970 | Dunning | 426/660 |
| 4,017,645 | 4/1977 | Ziccarelli | 426/660 |
| 4,042,721 | 8/1977 | Ziccarelli | 426/613 |
| 4,151,308 | 4/1979 | Ziccarelli et al. | 426/613 |
| 4,440,797 | 4/1984 | Berkes et al. | 426/613 |
| 4,713,256 | 12/1987 | Chaveron et al. | 426/631 |
| 4,980,192 | 12/1990 | Finkel | 426/631 |
| 5,156,867 | 10/1992 | Leuthold | 426/660 |
| 5,156,868 | 10/1992 | Müntener | 426/660 |
| 5,156,878 | 10/1992 | Tadema | 426/631 |
| 5,200,220 | 4/1993 | Capodieci | 426/660 |
| 5,215,771 | 6/1993 | Callebaut | 426/660 |
| 5,244,690 | 9/1993 | Van der Schueren et al. | 426/660 |
| 5,332,588 | 7/1994 | Capodieci | 426/660 |
| 5,460,840 | 10/1995 | Capodieci | 426/660 |

FOREIGN PATENT DOCUMENTS

| | | |
|---|---|---|
| 593833 | 4/1994 | European Pat. Off. . |
| 9409649 | 5/1994 | WIPO . |

OTHER PUBLICATIONS

Minifie 1980 Chocolate, Cocoa and Confectionary: Science & Technology 2nd ed. AVI Publishing Westport CT pp. 113–124.

Desrosier 1977 Elements of Food Technology AVI Publishing, Westport CT pp. 579–587.

Minifie 1980 Chocolate, Cocoa & Confectionary: Science and Technology 2nd ed. pp. 94–103, 125–126.

*Primary Examiner*—Carolyn Paden
*Attorney, Agent, or Firm*—Fitch, Even, Tabin & Flannery

[57] ABSTRACT

The present invention is directed to a method for reducing the viscosity of melted chocolate. In the method, a chocolate mixture is provided which includes a chocolate source, a fat source and a sweetener. The chocolate mixture is subjected to refining and conching or other processing. Thereafter, the liquified chocolate mixture, which is liquified during conching, is subjected to high shear mixing while the chocolate mixture is still in the molten state.

4 Claims, No Drawings

5,676,995

METHOD FOR REDUCING THE VISCOSITY OF CHOCOLATE

This application is a continuation, of application Ser. No. 08/461,430, filed Jun. 6, 1995, now abandoned.

FIELD OF THE INVENTION

The present invention is directed to a method for reducing the viscosity of melted chocolate. More particularly, the present invention is directed to a method for reducing the viscosity of melted chocolate which results in an improvement in the smoothness of the chocolate. As used herein, the term chocolate means confectionery masses containing cocoa butter and/or other vegetable fats.

BACKGROUND OF THE INVENTION

The essential components of a conventional chocolate formulation are cocoa "nib", i.e., the roasted cocoa bean with shell and germ removed, sugar and cocoa butter additional to that contained in the nib. Cocoa nib is approximately 50% cocoa butter, the balance being proteins, carbohydrates, tannins, acids, etc. The cocoa butter content of the chocolate controls its setting characteristics and largely governs its cost, and while the ratio of cocoa nib to sugar determines the type of chocolate, the cocoa butter content varies according to the application. Thus, bitter sweet chocolate has a ratio of nib to sugar of 2:1 while sweet chocolate has a ratio of 1:2. Molding chocolate may have a fat content of 25% to 40%, covering chocolate 33 to 36%, chocolate for hollow goods 38 to 40% and chocolate for covering ice cream 50 to 60%.

The typical preparation of chocolate involves four stages. In the first stage, the ingredients are mixed together in a process which also involves grinding or rubbing, e.g., on a multiple roll press to provide a smooth fluid paste. The ingredients may be added sequentially and in particular the cocoa butter may be added stepwise to control the viscosity of the composition. The sugar may also be preground to a smaller particle size to reduce the length of time required in the grinding/rubbing of the chocolate mixture. Most chocolate, and certainly all good quality product, is subjected after mixing to the process of "conching" in which the chocolate mixture is subjected to temperature treatment and mechanical working to give the chocolate an improved texture and a fuller and more homogeneous flavor. Other ingredients such as flavors, e.g., vanilla and extra cocoa butter may be added at this stage if desired. A frequently added additional ingredient is lecithin or other emulsifier which improves the flow properties of the chocolate and thereby enables the amount of fat to be reduced. The third stage of the chocolate preparation is called "tempering" in which nuclei are provided in the liquid chocolate composition to facilitate the rapid crystallization of selected stable fat crystals on cooling. The final appearance of the chocolate, its texture and keeping properties depend upon correct tempering stage conditions. After tempering, the chocolate may finally be cast into molds to set or may be used in an enrobing process to produce chocolate coated confectionery, etc.

The present invention is concerned in particular with the conching step, during or after liquification, in the process described in the preceding paragraph. Generally, the drying and liquification steps are performed during conching. The changes taking place during conching are subtle and not completely understood. What is certain is that the texture of the chocolate is improved and the flavor changed to the extent that without conching the taste of the chocolate is generally commercially unacceptable. The kneading action during the conching process and the maintenance of an elevated temperature together cause evaporation of moisture and volatile acids such as acetic acid, destroy harsh flavors and reduce astringency, probably due to modification of tannins and the reduction in viscosity.

There are two stages in the conching operation, a first stage called "dry" conching and a second stage called "liquid" conching. The dry conching process is operated for a period of up to 20 hours at a temperature above 60° C. and usually about 80° C. The extra fat and other ingredients are added towards the end of the conching period, e.g., about one hour before the end of the period. In the liquid conching stage all of the fat and other ingredients such as lecithin are present early in the process to maintain the fluidity of the mass which is mechanically worked for a prolonged time, e.g., 2 or 30 hours or more and at a relatively low temperature, e.g., 40° C. up to 60° C.

Conching procedures and equipment have evolved over the years. Early conches were of the longitudinal type having long marble tubs with raised sides forming a shell. In this shell, an undulating granite roller worked and mixed the chocolate for from 24 to 36 hours. Later, classical mixers were able to reduce conching time to between about 5 to 8 hours by using plow and shear blades to tumble dry refinings in the beginning of dry conching and then, when the mass is plasticized, put energy into the material being conched. Another current rotary conch incorporates a horizontal mixer design which has three shafts with kneading and shearing blades attached. The center blade rotates in one direction and the two outboard shafts rotate the opposite direction, which directions are reversed when desired. These types of horizontal rotary conches provide a so-called "double-overthrow" action to thoroughly mix and bring new material into its high shear zones in order to shorten the dry conching cycle time. Scrapers and kneader stirrer arms on the horizontal shafts overlap one another, providing powerful shearing in the mass and at the walls.

The viscosity of the melted fat after conching increases as the level of fat is reduced. For this reason, enrobing chocolate which requires a high degree of fluidity has the highest level of fat, i.e., about 50% cocoa butter. It would be desirable to provide a method for reducing the viscosity of the melted chocolate after liquification produced during conching or other suitable processing at the lower fat levels to permit lower fat contents to be used in the manufacture of the chocolate. It would also be desirable to provide a method for treating the chocolate to improve the smoothness of the chocolate for better customer acceptance.

SUMMARY OF THE INVENTION

The present invention is directed to a method for reducing the viscosity of melted chocolate. In the method, a chocolate mixture is provided which includes a chocolate source, a fat source and a sweetener. The chocolate mixture is subjected to refining and conching or other processing. Thereafter, the liquified chocolate mixture is subjected to high shear mixing while the chocolate mixture is still in the molten state.

DETAILED DESCRIPTION OF THE INVENTION

The method of the present invention is not limited to the production of a chocolate product from any specific starting ingredients, but may be used with any ingredients normally employed, e.g., cocoa powder, chocolate liquor, cocoa butter, and/or other vegetable fats, such as coconut oil and palm kernel oil, sugar and/or sugar replacer, lecithin, etc. Likewise, the process is not limited to the production of any specific type of chocolate product, but is useful for the production of a variety of chocolate products, such as chocolate coatings, sweet chocolate, bittersweet chocolate, milk chocolate, enrobing chocolate, etc. Since the method of the invention reduces the viscosity of the melted chocolate after the liquification step of conching, it is possible to use levels of fat lower than are normally used in the preparation of chocolate products. The level of total fat in commercial chocolate products is from above about 22%. In the method of the present invention, the total fat level may be reduced by about 3% and in some cases by as much as 10%.

In one embodiment of the present invention, cocoa liquor is combined with the sweetener, usually sucrose and an emulsifier, usually lecithin and other ingredients. This mixture is then subjected to roll refining to reduce the particle size of the cocoa particles, the sugar particles and milk powder, if present. The grittiness of the final chocolate product is dependent upon the size of the particles which are produced during the refining step. It is usually desirable to have very fine particles of less than about 15–50 microns. However, size reduction beyond a certain point results in an increase in viscosity of the chocolate after liquification. Size reduction heretofore has been constrained by such viscosity increase to a larger particle size than desired. In the method of the present invention, however, the viscosity of the liquified chocolate is reduced which means that lower particle sizes can also be used.

The refined cocoa mixture is then combined with cocoa butter or other suitable confectionery fat, such as coconut oil or palm kernel oil prior, during or after liquification during conching. Some of the cocoa butter may be withheld until the end of the conching step. The conching step takes place in suitable commercial equipment at a temperature in the range of from about 55° C. to about 80° C.

After liquification, the chocolate mixture, while still melted, is subjected to high shear mixing. The temperature of the mixture, which is dependent upon the particular ingredients included therein, i.e., the type of fat moiety, can range between 40° C.–80° C. For example, a higher melting fat, such as, a more highly saturated fat, like palm oil, requires a higher mixture temperature when processing in the high shear mixer. The high shear mixing takes place in suitable apparatus which is sufficient to impart a peak shear of from about 3000 sec$^{-1}$ to about 70,000 sec$^{-1}$ and a shear history of from about 100 to about 20,000. Shear history is a dimensionless number and is a summation of the shear rate times the residence time of the volume of all elements under shear. Suitable high shear mixers include the Dispax™ mixer, the Hydroshear™ mixer and the Pentax™ mixer. The Dispax™ mixer is a preferred mixer for reasons of simplicity of operation and design. The Dispax mixer consists of from 1 to 3 stages of rotor/stators mounted in a cylindrical housing. The melted chocolate as it passes through the Dispax mixer is forced to flow between the clearance between the rotor and the stator and is sheared during the passage.

The following example further illustrates the method of the invention, but is intended to in no way limit the scope of the invention as set forth in the appended claims.

EXAMPLE 1

Five lots of a milk chocolate composition having the following composition were prepared:

| Ingredient | Weight Percent |
| --- | --- |
| Cocoa liquor | 12.7% |
| crystallized sugar | 44.5% |
| added cocoa butter | 14.3% |
| milk powder | 17.5% |
| other ingredients | 11.0% |

The ingredients were ground and mixed together to form a homogeneous mass while at a temperature of 35° C. The mixture was then milled on a five roller mill until the desired average particle size of 20 to 40 microns was achieved. The mixture was then conched in a rotary conch for 6 hours at a temperature of 60° C. Additional cocoa butter (about 3.0%) and lecithin (about 0.7%) were added after 4 hours. The chocolate mass, while at a temperature of 45° C.–55° C. was then processed through a Dispax™ mixer containing a single stage of coarse rotor-stators. The results for the 5 lots of chocolate, with respect to viscosity before and after treatment with the high shear mixer are as follows:

TABLE 1

| Viscosity Reduction | Temperature Rise |
| --- | --- |
| 38% | 30 |
| 25% | 30 |
| 29% | 27 |
| 28% | 30 |
| 27% | 19 |

What is claimed is:

1. A method for reducing the viscosity of melted chocolate comprising:

(a) providing a chocolate mixture comprising a chocolate source selected from the group consisting of cocoa powder and chocolate liquor, a fat source selected from the group consisting of cocoa butter, a vegetable fat and a sweetener;

(b) subjecting said chocolate mixture to conventional conching at a low shear rate; and (c) further subjecting said conched chocolate mixture to high shear mixing while said chocolate mixture is melted wherein the high shear mixing imparts a shear rate of from about 3,000 sec$^{-1}$ to about 70,000 sec$^{-1}$ and a shear history of from about 100 to about 20,000, whereby the viscosity of the melted chocolate mixture is further reduced relative to the viscosity of the conched chocolate mixture.

2. A method in accordance with claim 1 wherein the total fat of said melted chocolate is from about 22% to about 50% by weight.

3. A method in accordance with claim 1 wherein at least part of said chocolate mixture is subjected to roll refining to reduce the particle size of the cocoa powder and sweetener to from about 15 microns to about 50 microns.

4. A method in accordance with claim 2 wherein at least part of said chocolate mixture is subjected to roll refining to reduce the particle size of the cocoa powder and sweetener to from about 15 microns to about 50 microns.

* * * * *